Sept. 4, 1956 W. SINDZINSKI 2,761,633
DEVICE FOR SLOWING DOWN THE SPEED OF
PNEUMATIC TUBE DISPATCH CARRIERS
Filed May 26, 1953 2 Sheets-Sheet 1
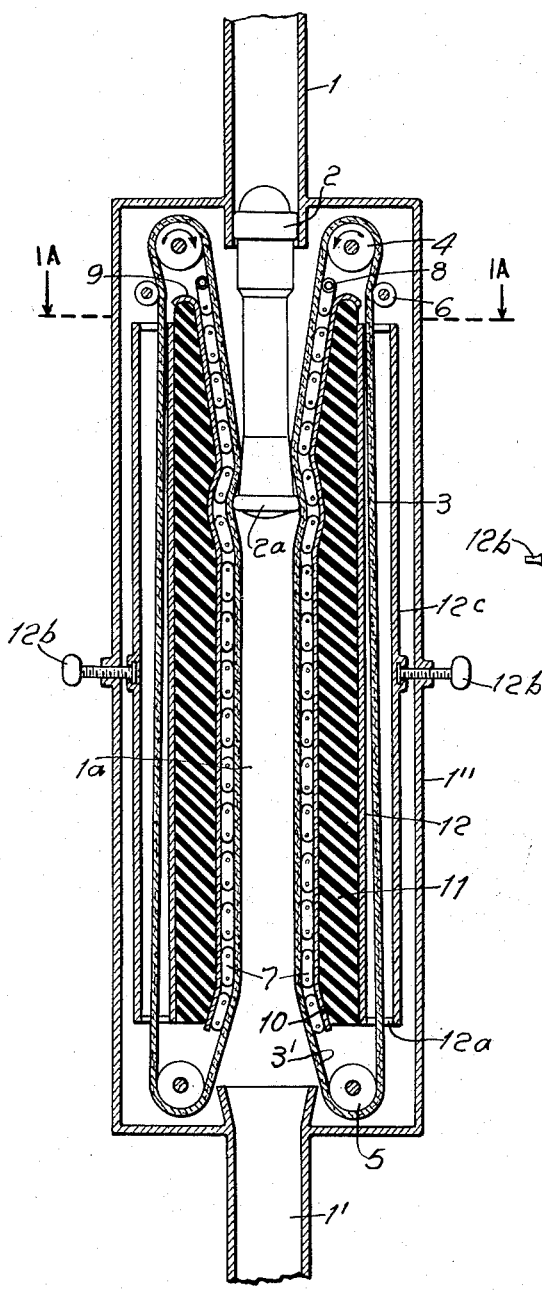
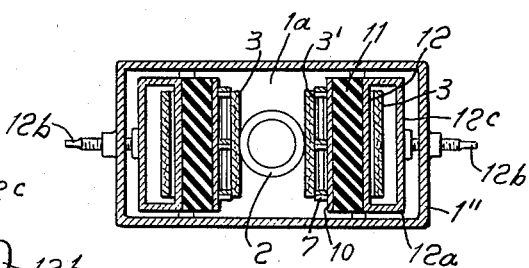
INVENTOR
WILLY SINDZINSKI
BY R. P. Morris
ATTORNEY

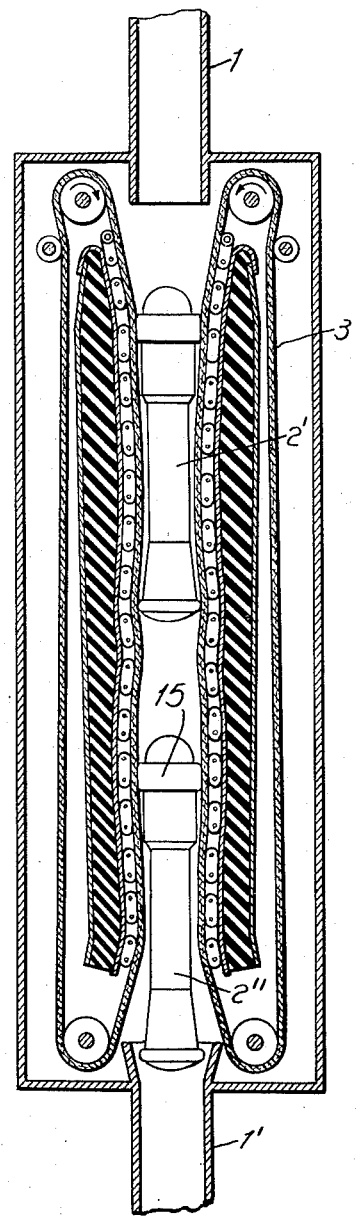
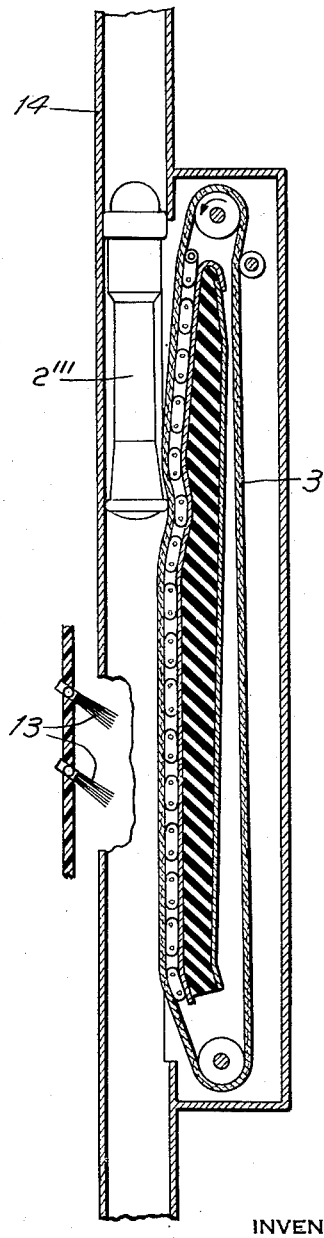

United States Patent Office 2,761,633
Patented Sept. 4, 1956

2,761,633

DEVICE FOR SLOWING DOWN THE SPEED OF PNEUMATIC TUBE DISPATCH CARRIERS

Willy Sindzinski, Berlin, Germany, assignor to International Standard Electric Corporation, New York, N. Y., a corporation of Delaware Application May 26, 1953, Serial No. 357,406

Claims priority, application Germany May 31, 1952

9 Claims. (Cl. 243—38)

This invention relates to improvements in pneumatic tube carrier systems and particularly to means for decelerating the speed of carriers arriving at terminals in such systems.

Frequently it is the problem in pneumatic tube systems to reduce the high speed of the travelling dispatch carriers within a short distance by braking. A very high velocity is reached by the carriers especially at the terminals of the pneumatic tubes leading downwardly, which is due to the gravitational pull upon the dispatch carrier in addition to the suction of the system (free fall). The braking devices which are traversed, as well as the carriers themselves, are thereby very likely to be damaged due to the great amount of kinetic energy which must be dissipated. Above all the usually employed carrier separating devices will be affected, because in these devices the carriers have to be stopped in an extremely short distance. It is common practice to use, for this particular purpose, resilient percussion members. Furthermore this percussion produces disturbing noises, which are transmitted through the system.

An object of the present invention is to provide an arrangement in which the speed of the incoming dispatch carriers is reduced by providing a braking device by means of which the carriers are braked in a short distance without damage to themselves or to the associated apparatus while suppressing the generation of disturbing noises due to the braking action. This is accomplished by means of flexible brake shoes, decreasing the diameter of the pneumatic tube, acting to dispel the kinetic energy generated by a decelreating dispatch carrier.

According to a further object of the present invention, the flexible brake shoes consist of chains which are cushioned by elastic paddings consisting preferably of crepe rubber or other suitable resilient materials.

Sliding over the brake shoes there are rotating conveyor belts, acting as a lining to the braking chamber preventing a complete stoppage of the dispatch carriers in the braking device. These belts, in accordance with the speed assigned to them, move the braked carriers along in continuation of their direction of movement through the tube until the belts reach the end of their travel. After leaving the belts the carrier is ejected from the braking chamber.

According to another object of the invention a contacting device is provided within the braking chamber, which device determines the destination identification of the dispatch carrier. My new braking device may also be employed as a carrier separating device. Carrier separation is necessary to effect switching of carriers through different branches of a pneumatic tube system. Each carrier must be shunted to its proper destination in accordance with the destination marking thereon and the speed of the rotating conveyor or transporting belts is lower than the rate of fall of a dispatch carrier departing the device. Owing to the different velocities an incoming train of carriers will be sufficiently separated from a train of carriers passing through the braking device.

A more thorough understanding of the present invention may be had from the following detailed description and the accompanying drawing, in which Fig. 1 shows the cross-section of my improvement of a device for slowing down the speed of pneumatic tube dispatch carriers, Fig. 1A is a sectional plan view taken along the line 1A—1A in Fig. 1;

Fig. 2 shows the same device employed as carrier separator; and

Fig. 3 shows a modification of my improved braking device provided with a contacting device.

Referring first to Fig. 1, an explanation will first be given of the device for reducing the speed of pneumatic tube dispatch carriers. There is illustrated a portion of an incoming pneumatic tube 1 and spaced therefrom a portion of an outgoing pneumatic tube 1', both portions being connected by connecting portion 1" which is of considerably wider diameter than either portion 1 or 1'; the portions 1, 1' and 1" having a common longitudinal axis. Both portions 1 and 1' are sealed to portion 1" in air-tight relation, thus protecting the suction within the system. This device consists of two brake shoes adapted to present a resilient, narrow diameter portion in the path of a carrier, which will brake the carrier. As will be understood, the inside diameter of tubes 1 and 1' substantially correspond to the widest diameter of dispatch carrier 2. The brake shoes consist of a pair of spaced oppositely rotated belts 3 within the portion 1", each operating parallel to the longitudinal axes of the tube portions 1 and 1' and portion 1", in a single plane. The belts rotate about pulleys 4 and 5 in the direction of the arrows and may be adjustably tensioned by means of idler rollers 6. As shown, a dispatch carrier is ejected from tube 1 into the space 1a between the opposing belts 3. In order to vary the space 1a, viz., to make it smaller and thereby increase braking tension, I provide a pair of adjustable supports 12 which may be moved by means of thumb screws 12b which extend through opposite walls of connecting portion 1" to the rear walls 12c of supports 12 in a direction transverse to the longitudinal axes of tubes 1 and 1'. Disposed between the supports 12 and belts 3, I provide resilient material 11 and chains 7 respectively in that order so that the inside belt surfaces 3' travel over the chains 7. The return runs of belts 3 extend through the openings 12a at the lower and upper ends, respectively, of supports 12. By setting the axes of pulleys 4 and 5 in a plane between the planes of the chains 7 and the wall portion 1", respectively, I achieve a flared spacing at the end of the belts in proximity to the ends of the tube portions 1 and 1' respectively which renders it possible for a carrier 2 to readily enter the chamber 1a. Instead of chains, one may substitute a suitable resilient material such as a steel band. I have found it desirable to also include a flexible protecting strip 10 between the chains 7 and resilient material 11. The chains 7 may be anchored at point 8 and suspend therefrom as shown in the drawing. The protecting strips 10 may also be supported by a hooked portion 9 which portion extends over the top of the adjacent back support 12. It will be seen that by proper adjustment of the back support 12, the width of the space 1a may be varied and the kinetic energy of a carrier ejected from the tube 1 into the space 1a may be taken up by the resilient material 11. It will be apparent that the moving belts 3 prevent under wear of the ends 2a of carriers 2 since they travel in the same direction as the carrier at a predetermined speed.

As stated previously, my invention may be used not only as a braking device but also as a carrier separating device. Carrier separation is required where switching of the routes of various dispatch carriers is required, each carrier having a marking thereon either electrical, mechanical or otherwise, indicative of its ultimate destination. The marking must be sensed and switches operated in accordance with the sensed marking. In Fig. 2, I show my invention utilized as a separating device with two carriers 2' and 2" within the structure. Fig. 2 clearly shows how the sides of the braking chamber are distended by the ends 15 of the carriers 2' and 2". In Fig. 2, although the carriers are being conducted downwardly by means of the belts 3, as soon as carrier 2" is conducted into tube 1' the carrier 2' will follow it at a distance limited by the speed of the rotating belt 3 and the velocity of carrier 2' which is controlled by the width of the spacing of space 1a as explained in connection with the operation of Fig. 1. Thus if the speed of rotation of belts 3 is less than the rate of fall of a carrier 2" as it enters tube 1', a degree of separation of the carriers will be achieved. This arrangement provides an improvement over the conventional known separating devices wherein a whole train of carriers will be required to be braked at the same time requiring comparatively heavy braking material whereas in the present device an advantage is gained because the material need not be so heavy since the speed of each carrier is reduced individually by means of the flexible brake shoes.

In Fig. 3, I show another embodiment of my invention with only a single belt chain and resilient portion disposed longitudinally within the wall of tube 14. Thus the braking device in Fig. 3 acts to lessen the diameter of the tube 14, the carrier 2''' being urged against one side of the tube 14 by the belt 3 and its associated equipment. As the carrier 2''' passes through the braking device it is electrically sensed by means of sensing brushes 13 which project into the tube 14 as shown in the drawing. The brushes 13 may control switching aparatus (not shown) to control the destination of the carriers but which apparatus froms no part of this invention.

While I have described above the principles of my invention in connection with specific apparatus (and particular modifications thereof) it is to be clearly understood that this description is made only by way of example and not as a limitation on the scope of my invention.

What is claimed:

1. In a pneumatic tube dispatch carrier system, a device for braking the speed of carriers comprising an incoming pneumatic tube section and an outgoing pneumatic tube section having spaced end portions in coaxial relation, a connective housing for joining said end portions in air-tight relation, movable conveyor means within said housing, said means extending in a direction having a first plane parallel to the axis of said tube sections, flexible supporting means disposed between a wall of said housing and said conveyor means, adjustable support means and resilient means disposed between said adjustable support means and said flexible supporting means, said adjustable supporting means adapted to be moved in a direction transverse to the axis of said tube sections whereby to urge said conveyor means in a direction having a second plane parallel to the axis of said tube sections and closer thereto.

2. A braking device as claimed in claim 1, wherein said movable conveyor means comprises spaced pulley means mounted on parallel axes which are in a plane parallel to the axis of said tube sections, and endless belt means rotatably mounted over said pulley means, said belt means adapted to move in a direction parallel to the direction of movement of carriers in said incoming tube section and at a speed less than the speed of carriers arriving at said housing.

3. A braking device as claimed in claim 1, wherein said movable conveyor means comprises two pairs of spaced pulleys mounted on axes transverse to the axis of said tube sections, a pair of endless belts, each rotatably mounted over a different pair of said pulleys, said belts diametrically opposed and adapted to move in a direction parallel to the axis of said tubes and at a speed less than the speed of carriers arriving at said housing.

4. A braking device as claimed in claim 3, wherein said flexible supporting means comprises a pair of chain elements, each element disposed between a different one of said belts and diametrically opposite sides of the wall of said housing.

5. A braking device as claimed in claim 4, wherein said adjustable support means comprises a pair of adjustable members, each extending substantially along the distance between a different pair of said pulleys, each including means for adjustably moving said members in a direction transverse to the axis of said tubes.

6. A braking device as claimed in claim 5, wherein said resilient means comprises a pair of resilient members, each disposed between a different one of said adjustable members and said chain elements.

7. A braking device as claimed in claim 6, further comprising a pair of protecting strips, each disposed between a different one of said chain elements and said resilient members.

8. A braking device as claimed in claim 7, further comprising means for moving said conveyor belts over said pulleys at a predetermined rate of speed in the direction of travel of a carrier through said tubes.

9. In a pneumatic tube dispatch carrier system, a device for braking the speed of carriers comprising an incoming pneumatic tube section and an outgoing pneumatic tube section having spaced end portions in coaxial relation, a connective housing for joining said end portions in air-tight relation, movable retarding means within said housing, said means extending in a plane parallel to the axis of said tube sections, said means characterized by being movable in a first direction parallel to the direction of movement of carriers in said tube sections and in a second direction transverse to the direction of movement of carriers in said tube sections, thereby to dispel a substantial portion of the kinetic energy of said carriers.

References Cited in the file of this patent

UNITED STATES PATENTS

| 1,886,295 | Morris | Nov. 1, 1932 |
| 2,588,142 | McQueen | Mar. 4, 1952 |

FOREIGN PATENTS

| 733,829 | France | July 18, 1932 |
| 630,948 | Germany | June 9, 1936 |
| 134,255 | Australia | Sept. 13, 1949 |